Sept. 1, 1970     L. C. HEINLEIN     3,526,409
SEALING DEVICE
Filed Sept. 12, 1967     2 Sheets-Sheet 1
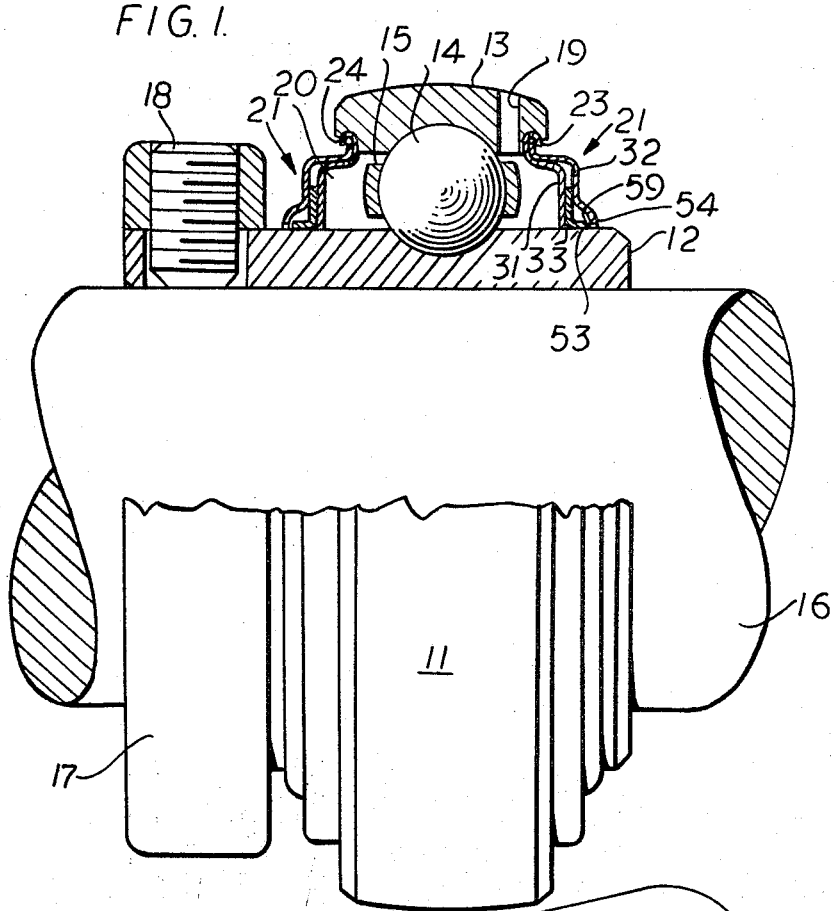
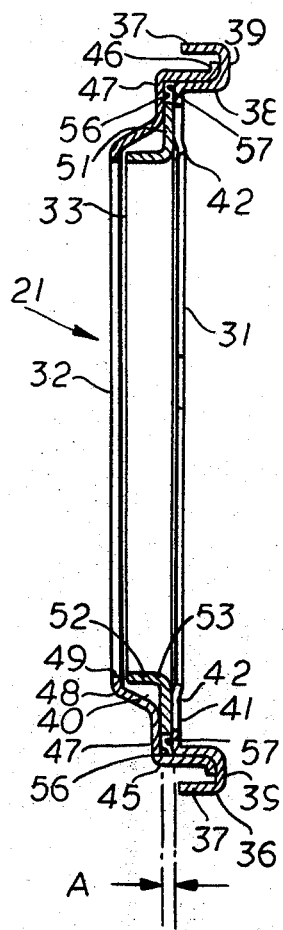
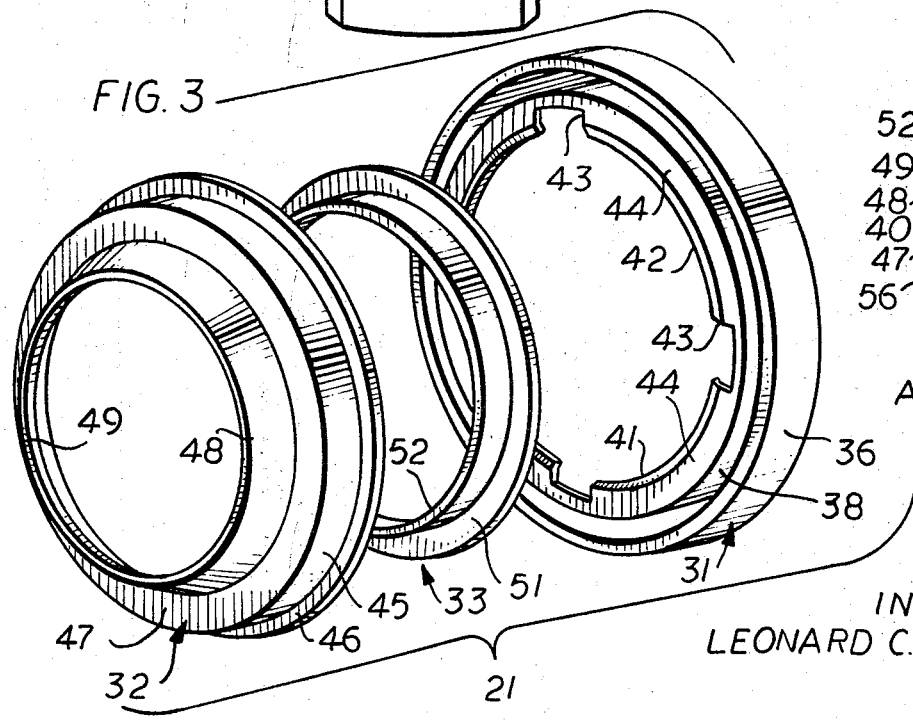
INVENTOR
LEONARD C. HEINLEIN Sept. 1, 1970          L. C. HEINLEIN          3,526,409
SEALING DEVICE
Filed Sept. 12, 1967          2 Sheets-Sheet 2
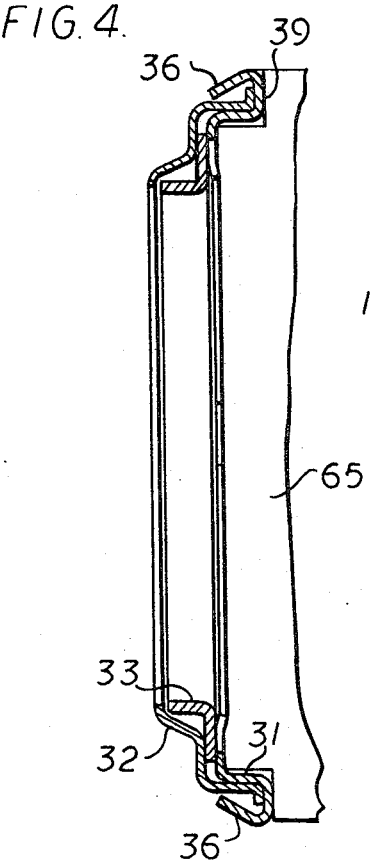
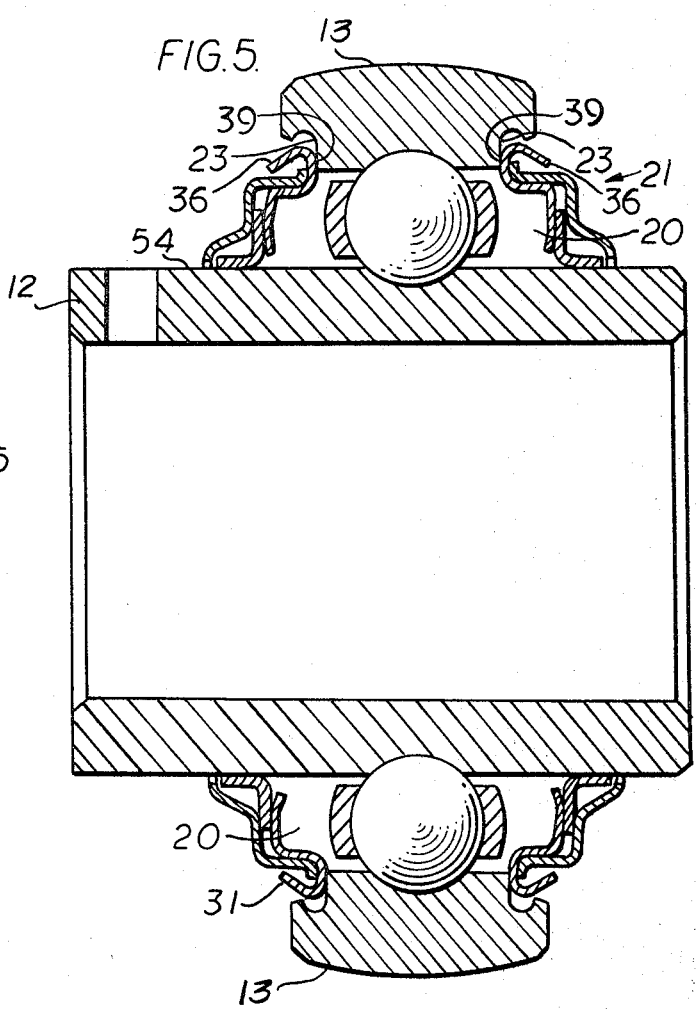
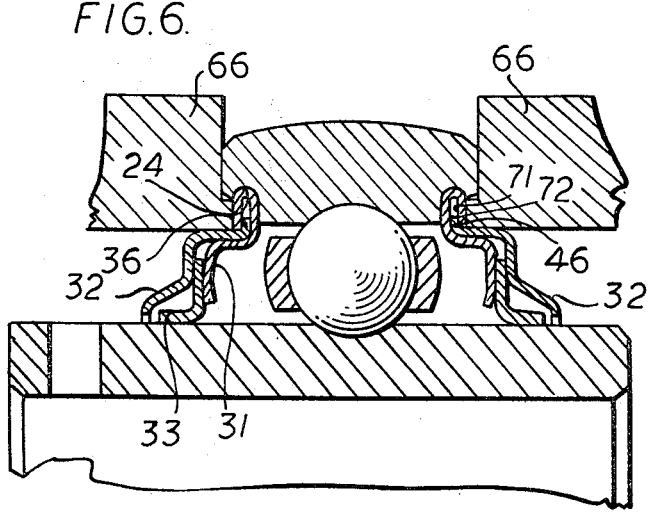
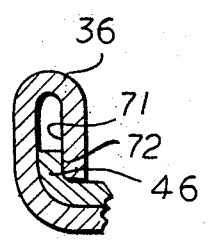
INVENTOR
LEONARD C. HEINLEIN

United States Patent Office 3,526,409
Patented Sept. 1, 1970

3,526,409
SEALING DEVICE
Leonard C. Heinlein, Indianapolis, Ind., assignor to FMC
Corporation, a corporation of Delaware
Filed Sept. 12, 1967, Ser. No. 667,290
Int. Cl. F16j 15/16
U.S. Cl. 277—169                                6 Claims

ABSTRACT OF THE DISCLOSURE

A device for sealing the annular space between two concentric, relatively rotatable members such as the outer and inner race rings of an anti-friction bearing. One seal element forms an annular groove into which another seal element is disposed for limited radial movement. The second seal element has an annular surface which cooperates with a corresponding surface on one of the rotatable members to form an annular capillary-like opening for preventing the egress of lubricant and the ingress of foreign matter.

BACKGROUND OF THE INVENTION

Field of the invention

This invention relates to new and useful improvements in devices for sealing the annular space between two concentric, relatively rotatable members and deals more particularly with seals for anti-friction bearings.

This invention will hereinafter be described in connection with an industrial ball bearing unit, but it should be understood that the seals of this invention are generally applicable to seal the annular space between any two relatively rotatable, concentric rings without interfering with the free relative rotation thereof.

Description of the prior art

Certain types of prior metal seals for bearings have required pressing a retainer ring into a circumferential groove formed in the outer race ring and also pressing a flinger ring or other seal member onto the inner race ring. The flinger and the retainer ring rotate relative to one another while the bearing unit is running and utilize a centrifugal action to prevent the ingress of dirt. It should be obvious that the retainer and flinger rings have to be maintained in a close-running clearance relationship.

Assembling a seal of the above-described type is difficult due to having to align the retainer ring with the flinger ring while the parts are retained on separate relatively rotatable parts. Some anti-friction bearings have enough clearance to permit very limited misalignment of the outer and inner race rings. Due to this limited misalignment, maintaining a close-running clearance relationship between seal parts fixedly mounted separately on the outer and inner race rings respectively is difficult and not always possible. Therefore, this type of seal is not completely reliable for a loose clearance bearing unit.

SUMMARY OF THE INVENTION

A seal for an anti-friction bearing, constructed in accordance with this invention, includes a metal retainer of annular form and of channel shape in cross-section and annular sealing element retained within the retainer and having a cylindrical surface for cooperating with a corresponding cylindrical surface on one of the race rings to form an annular opening having a configuration for preventing the egress of lubricant and the ingress of dirt. The preferred embodiment of the invention, as illustrated on the drawings, includes a retainer formed of two separate parts which are pressed into a circumferential groove in the outer race ring and which extend radially inward toward the inner race ring. The two parts which form the retainer have opposed surfaces which form a radially inwardly opening circumferential channel.

The sealing element of the preferred embodiment of the invention is annular in form and of an L-shaped cross-section. The radially extending leg of the seal element protrudes into the circumferential channel formed by the retainer. The axially extending leg forms a cylindrical surface which is adjacent and spaced apart from a corresponding cylindrical surface on the inner race ring and cooperates therewith to form an annular capillary-like opening. The two parts which form the retainer are shaped to converge toward the opening of the channel. Due to the converging shape of the parts, the retainer is formed to grip the sealing element to prevent unnecessary floating thereof while still permitting the sealing element to partake of limited radial movement so that the latter will properly center itself and form the annular capillary-like opening.

"Capillary" denotes a very narrow hair-like opening and, for example, "annular capillary-like opening" as used herein contemplates the space formed between two co-axial members with the inside diameter of the outer member being very slightly larger than the outside diameter of the inner member.

The lubricant used in an industrial ball bearing, having a seal according to this invention, is commonly a grease which is introduced into the cavity surrounding the anti-friction elements under a pressure of several hundred pounds. When the grease gun is released from the bearing grease fitting, any pressure built up in the lubricant cavity is relieved through the capillary-like annulus causing a slight amount of seepage of the lubricant through the opening. Since this seal will release any excess grease pressure, it prevents a grease mechanic from blowing out the seals or the running of the bearing from creating an undesirably high grease pressure within the lubricant cavity. An excessively high grease pressure may create a drag on the bearing which could raise the bearing running temperature.

Preferably when this seal is assembled in the bearing, the annulus formed between the seal and the inner race ring has a radial thickness of approximately .0005 inch for small shaft size bearings and a proportionately larger thickness for larger shaft size bearings. The axial length of the annulus formed between the seal and one of the race rings ranges from approximately 15 times the annulus thickness for small shaft size bearings to approximately 200 times the annulus thickness for large shaft size bearings.

Due to the small amount of clearance compared to the axial length of the annulus and the high viscosity of the lubricant, the amount of pressure required to achieve an appreciable fluid velocity of the lubricant outwardly through the annulus is higher than the normal pressure generated in a properly filled bearing cavity by the agitation of the lubricant due to movement of the anti-friction bearing elements. Although, over a period of several weeks running time, small amounts of grease will seep through the annulus. This seepage is desirable in several bearing applications since it tends to purge the annulus of any dirt or grit that may have entered the small area between the seal and inner race ring.

Since none of the seal elements contact any moving element of the bearing, this seal does not add a significant amount of friction to the bearing which would require energy to overcome, whereas, the flinger type seal creates a centrifugal pumping action to throw off dirt and prevent egress of lubricant. This pumping action could dissipate a significant amount of energy. Thus a seal of the present invention could have advantages over the flinger type seal where the bearing application requires a minimum of lost energy.

Since a seal constructed according to the present invention does not require a close running clearance in an axial direction between seal parts, this seal will permit relative axial movement of the inner and outer rings. In a bearing application where there is a thrust loading, the inner race ring may experience limited axial movement relative to the outer race ring which is usually mounted in a stationary housing.

The ingress of large particles of foreign matter is prevented by the very small thickness of the annular capillary-like opening, and extremely small particles of foreign matter are prevented from entering the bearing lubricant cavity by the purging action described above and also by the pressure drop across the seal. When the bearing is running the movement of the antifriction elements agitates the grease and thereby, increases the pressure within the bearing element cavity. Therefore, to force small particles of dirt or grit into the bearing requires overcoming this positive gauge pressure within the bearing cavity. In all but a few bearing applications the fine particles of grit will not be pressed against the seal under a sufficient pressure to overcome the internal bearing pressure and be forced through the annular capillary-like opening.

It is the primary object of this invention to provide an improved sealing device for closing the annular space between two relatively rotatable, co-axial rings defining a chamber therebetween for containing a lubricant, wherein the sealing device includes a cylindrical surface adjacent to a corresponding cylindrical surface on one of the rings for cooperating therewith to form a capillary-like annulus which will relieve excess pressure in the lubricant chamber and prevent the ingress of foreign matter into the chamber.

Another important object of this invention is to provide a sealing device for closing the annular space between two relatively rotatable rings defining a chamber therebetween for containing a lubricant, wherein the seal directly contacts only one of the rings, therefore creating no drag on the relative rotation of the rings, while also preventing the egress of lubricant and the ingress of foreign matter.

Other objects and advantages of the invention will be apparent from the following description of a preferred embodiment of the invention.

In the accompanying drawings, forming a part of this specification and in which like reference characters are employed to designate like parts through the same, FIG. 1 is a partly elevational and partly sectional view of a ball bearing provided with seals embodying the invention, FIG. 2 is a sectional view taken on a diameter of one of the seals of the invention illustrating the assembly of the seal parts prior to its being pressed into the bearing, FIG. 3 is an exploded view showing in perspective the elements of the seal that are then assembled into the relationship shown in FIG. 2, FIG. 4 is a sectional view similar to FIG. 2, and illustrating a secondary assembly operation beyond that shown in FIG. 2, FIG. 5 is a sectional view of a ball bearing provided with seals embodying the invention, and illustrating the initial positioning of the seal elements in the bearing prior to their being finally pressed into the bearing, FIG. 6 is a fragmentary, sectional view of a bearing provided with seals embodying the invention, and illustrating the method of finally pressing the seals into the bearing outer race ring, and FIG. 7 is a fragmentary, enlarged sectional view taken on a diameter of the seal and illustrating the configuration of the outer peripheral edges of the seal members after they are finally pressed into the bearing outer race ring.

In the drawings, wherein is shown a preferred embodiment of this invention, and first particularly referring to FIGS. 1 through 3, inclusive, there is shown an industrial ball bearing 11 having an inner race ring 12, an outer race ring 13, an a series of rolling elements 14 held in proper relationship by a retainer 15. The inner race ring 12 of the bearing 11 is snugly fitted onto a shaft 16 and secured thereto by means of a locking collar 17 and a set screw 18 in a conventional manner. Formed in the outer race ring 13 is an aperture 19 provinding communication between the inner lubricant cavity 20 (formed between the inner and outer race rings 12 and 13, respectively) of the bearing 11 and the exterior of the bearing to permit introduction of a lubricant, such as number 2 grease, into the cavity. The outer race ring 13 is also provided with a counter-bore 23 and an under cut circumferential groove 24.

To close the annular opening formed between the inner and outer race rings 12 and 13 respectively, the bearing 11 is provided with seals 21. The inner race ring 12 and outer race ring 13 and the two seals 21 complete the cavity 20 which contains the lubricant for the bearing 11. The following detailed description of one of the identical seal assemblies 21 is believed to be sufficient for both.

The seal elements will first be described in their unassembled configuration as they are shown in FIGS. 2 and 3, followed by a description of the method of assembly of the seals 21 into the bearing 11. The seal 21 is composed of an inner member 31 and an outer member 32 which cooperate to retain the sealing member 33. The inner seal member 31 is provided with a body portion 36 which, when the seal is unassembled, is annular in form and of an axially outwardly opening channel shape in cross-section. In particular the body portion 36 consists of an outer cylindrical portion 37 and an inner cylindrical portion 38 connected by an annular medial portion 39. Extending radially inwardly of the inner cylindrical portion 30 is a retaining flange 41 which is annular in form.

By inspecting the drawings, it will be seen that the tip 42 of the flange 41 is formed to dip slightly inwardly. Flange 41 is also provided with slots 43 at circumferentially spaced intervals to form spring fingers 44. In its unassembled form flange 41 is slightly biased outwardly, and when the seal is assembled the spring fingers 44 formed by flange 41 urge the sealing member 33 against the outer member 32 and thereby retain the sealing member within the radially inwardly opening channel 40 formed by the inner member 31 and outer member 32.

By inspecting FIGS. 2 and 3, it will be seen that the outer seal member 32 is provided with a cylindrical portion 45, and a radially outwardly protruding annular flange portion 46. Outer member 32 is also formed to provide a retaining flange 47 which projects radially inwardly of the cylindrical portion 45 and is parallel with flange 41 of inner seal member 31 when the seal 21 is assembled. Projecting axially outwardly and radially inwardly of the retaining flange 47 is the cover flange 48 which protects the sealing member 33 from damage by large particles of foreign matter which may be thrown against the sealing unit. Flange 48 forms a radially inwardly facing cylindrical surface 49 which is of a slightly greater diameter than the outer diameter of the inner race ring 12 to provide clearance therebetween.

Sealing member 33 is annular in form and of an L-shaped cross-section. The radially extending leg 51 of the sealing member 33 extends into the channel 40 formed by flange 41 of the inner member 31 and flange 47 of the outer member 32. The axially extending leg 52 forms an inner cylindrical surface 53 having a diameter which is slightly greater than the outside diameter of the inner race ring 12. The relationship between the diameter of the cylindrical surface 53 and the outside diameter of the inner race ring 12 depends upon the size of bearing in which the seal 21 is utilized. For small shaft size bearings the cylindrical surface 53 has a diameter which is approximately .001 inch larger than the outside diameter of the inner race ring 12. For larger bearings the diameter of the cylindrical surface 53 is proportionately greater than the outside diameter of the inner race ring 12. The cylindrical surface 53 and the outer cylindrical periphery 54 of the inner race ring 12 cooperate to form a capillary-like annular opening 59, as described above, having a configuration for preventing an excessive egress of lubricant from the bearing cavity 19 and also for preventing the ingress of foreign matter into the lubricant cavity.

It should be understood that the sealing element 33 may also be formed with an annular surface 53 which is not cylindrical (for example, a conical surface). If the surface 53 is, for example, conical in form, then the inner race ring 12 must also be formed with a corresponding surface which is conical in form and which cooperates with the conical surface of the sealing element to form a capillary-like annular opening. The seal members may also be reversed with the retaining portion affixed to the inner race ring and the sealing element having a surface for cooperating with a corresponding surface on the outer ring to form the capillary-like opening.

The inner diameter of the cylindrical portion 45 of the outer element 32 and the outer diameter of the cylindrical portion 38 of the inner member 31 are of proper relative dimensions to provide a tight fit when the outer and inner members are assembled together. When the seal is assembled the inner surface of flange 46 contacts the outer surface of the medial portion 39 of the inner member 31 to provide proper spacing between flange 47 and flange 41 of the outer member 32 and inner member 31 respectively. Flange 47 and flange 41 have opposed surfaces 56 and 57 respectively which are spaced apart a distance indicated by "A." When the seal 21 is unassembled the distance "A" should be slightly less than the thickness of the leg 51 of the sealing member 33 which extends into the channel 40.

During assembly of the seal, the spring fingers 44 formed by flange 41 urge the sealing element 33 against the surface 56 of flange 47, and thusly, the spring fingers are flexed into a position of approximate parallelism with flange 47.

The spring fingers 44 retain the sealing element 33, as described above to only permit limited, restrained radial movement of the latter when a finite, but limited force is exerted in a radial direction upon the sealing member. The sealing element 33 will move radially when the proper force is applied. This limited radial movement is necessary to facilitate assemblying the seal and also to allow the sealing member to properly center itself with respect to the inner race ring for providing the proper capillary-like annular opening between the outer peripheral surface 54 of the inner race ring 12 and the inner cylindrical surface 53 of flange 52 of the sealing member 33.

To affect assembly of the structure illustrated in FIG. 1 requires three separate operations. The first operation includes fitting the parts together in the orientation illustrated in FIG. 2. The second operation is a secondary assembly operation wherein the assembly illustrated in FIG. 2 is placed upon a pilot 65 as illustrated in FIG. 4. The pilot 65 is a member of the lower half of a standard punch press die assembly (not shown). As the upper half of the die (not shown) approaches the pilot 65 the outer cylindrical portion 36 of the inner member 31 is bent radially inwardly and axially downwardly to form the assembly illustrated in FIG. 4. After the secondary assembly operation the seal members 31, 32, and 33 are secured together into the unit referred to as seal 21.

Referring now to FIG. 5, it will be seen that the seal units 21 formed by the secondary assembly operation are fitted over the outer peripherial surface 54 of the inner race ring 12, and are pushed along the inner race ring until the annular portion 39 of the inner member 31 comes to rest on the shoulder 23 of the outer race ring 13. Normally, a seal unit 21 is positioned in the above-described manner on either side of the bearing 11 so that the inner race ring 12, outer race ring 13 and seals 21 cooperate to form the lubricant cavity 20.

After the seal units 21 are fitted over the inner race ring 12 in the above-described manner the bearing unit is placed in an appropriate die assembly of a hydraulic press or similar device. With the bearing 11 and seals 21 properly positioned within die blocks 66, as illustrated in FIG. 6, the die blocks are urged toward one another in a conventional manner so that they contact the previously bent outer cylindrical portions 36 of the inner seal members 33 and expand the portion 36 axially inwardly and radially outwardly into the groove 24.

By referring to FIG. 7, it will be seen, that with the outer cylindrical portions 36 of the inner members 31 expanded into the grooves 24, that the portion 36 now has an inner surface 71 which contacts the outer surface 72 of the flange 46 of the outer member 32 to form the completed seal unit as illustrated in FIG. 1. With the seal so assembled in the bearing, the inner seal member 31 and outer seal member 32 form the retainer of the bearing seal 21, and the sealing element 33 extends into a channel 40 formed by inner and outer seal members and is thereby retained within the seal.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A non-contact lubrication sealing device for substantially closing, against egress of lubricant and ingress of foreign material, an end of an annular space defined between a pair of radially spaced members mounted for relative coaxial rotation by bearing means disposed in the space, one of the members having an axially extending, circumferential surface disposed in facing relationship to the other member, said seal comprising:

annular means mountable on the other member having a pair of spaced retaining flanges forming a generally radially extending, circumferential channel opening toward said surface; and a dimensionally stable seal ring element having a substantially planar, radially extending annular portion disposed in said channel and a portion defining an axially extending circumferential surface configured for being disposed in closely radially spaced coaxial relationship to the surface of said other member to define an annular, axially extending, capillary-like opening between said surfaces, said retaining flanges of said annular means being biased toward each other to grip said radially extending portion of said seal ring element under limited friction to prevent floating of said ring element while permitting the seal ring element to partake of limited unnecessary movement in any direction within the plane of said radially extending portion, said radially extending portion being of a size to only partially fill the radial extent of said channel throughout the circumferential extent of said channel whereby to facilitate said limited movement radially and rotationally in adjusting to movements of the relatively rotating members.

2. A sealing device as set forth in claim 1 wherein said annular means comprises a pair of annular inner and outer housing members joined at their outer peripheries, said housing members each providing one of said retaining flanges.

3. A sealing device as set forth in claim 1 wherein said spaced retaining flanges normally gradually converge in a direction toward the opening of said channel, one of said retaining flanges having a plurality of circumferentially spaced spring fingers defined between a plurality of circumferentially spaced, radially extending slots, and said spring fingers frictionally engage said annular portion of said seal ring element to urge the same into frictional engagement with the other retaining flange.

4. A sealing device as defined in claim 1 wherein said channel and said annular portion each extend substantially perpendicularly relative to the axis of relative rotation of said members.

5. A sealing device as set forth in claim 1 wherein said surfaces are substantially concentric to the axis of relative rotation of the members.

6. A sealing device as set forth in claim 1 wherein said seal ring element is generally L-shaped in cross-seciton.

References Cited
UNITED STATES PATENTS

| | | | |
|---|---|---|---|
| 1,262,172 | 4/1918 | Caughling | 277—174 |
| 2,706,123 | 4/1955 | Cobb | 277—94 |
| 3,245,735 | 4/1966 | Sikora. | |
| 3,301,568 | 1/1967 | Perry | 277—94 XR |
| 2,101,013 | 11/1937 | Leister et al. | 308—187.1 |
| 2,237,616 | 4/1941 | Smith | 308—187.2 |
| 2,530,052 | 11/1950 | Firth | 308—187.2 XR |
| 2,619,369 | 11/1952 | Williams | 308—187.14 XR |
| 2,688,521 | 9/1954 | Annen | 308—187.2 |

DORSEY NEWTON, Primary Examiner

U.S. Cl. X.R.

308—187.1

UNITED STATES PATENT OFFICE
CERTIFICATE OF CORRECTION

Patent No. 3,526,409     Dated September 1, 1970

Inventor(s) Leonard C. Heinlein

It is certified that error appears in the above-identified patent and that said Letters Patent are hereby corrected as shown below:

Column 6, line 68, after "prevent" insert -- unnecessary --; lines 69 and 70, cancel "unnecessary" and insert therefor -- radial --.

Signed and sealed this 20th day of July 1971.

(SEAL)
Attest:

EDWARD M. FLETCHER, JR.
Attesting Officer-

WILLIAM E. SCHUYLER, JR.
Commissioner of Patents